G. MÜLLER.
WORM DRIVE FOR ELECTRIC CARS, ESPECIALLY MINE LOCOMOTIVES.
APPLICATION FILED OCT. 7, 1921.

1,421,534.

Patented July 4, 1922.

Inventor:
Gottwalt Müller
by Hubert Sefton Jones
Attorney

200~# UNITED STATES PATENT OFFICE.

GOTTWALT MÜLLER, OF BERLIN-WEISSENSEE, GERMANY.

WORM DRIVE FOR ELECTRIC CARS, ESPECIALLY MINE LOCOMOTIVES.

1,421,534.

Specification of Letters Patent.

Patented July 4, 1922.

Application filed October 7, 1921. Serial No. 506,139.

*To all whom it may concern:*

Be it known that I, GOTTWALT MÜLLER, a citizen of the Republic of Germany, residing at Berlin-Weissensee, Germany, have invented certain new and useful Improvements in Worm Drives for Electric Cars, Especially Mine Locomotives, of which the following is a specification.

In electric cars running on rails it is desirable to keep the part of the car which overhangs the wheelbase as small as possible, with the object of minimizing the oscillations which influence unfavourably the running of the car, especially in the case of two axle cars with short wheelbase.

The shortening of the overhang is especially difficult to get on cars, the axles of which are driven by worm gears. The motor which is supported in a spring frame requires a flexible shaft for the transmission of its power. This shaft has to be as long as possible, in order that the deflections of the shaft, resulting from the spring movements of the frame may be kept as small as possible. The arrangement of the motors in the hitherto known construction does not provide for this.

According to the present invention this drawback is done away with by supporting the motor beyond the wheelbase in line with the worm gear and in the longitudinal axis of the car and by constructing the motor with a hollow shaft, to the outer end of which the worm shaft is fixed.

This construction is particularly advantageous for two-axle locomotives, especially mine locomotive which must be short in construction, but can also find advantageous application in cars having three or more axles.

As soon as the driving power required for such cars exceeds a certain limit, difficulties arise in the use of a single motor, which would moreover have to be of relatively large dimensions. This difficulty is removed according to this invention by using two motors placed beyond the wheelbase, one at each end of the car.

Figure 1:
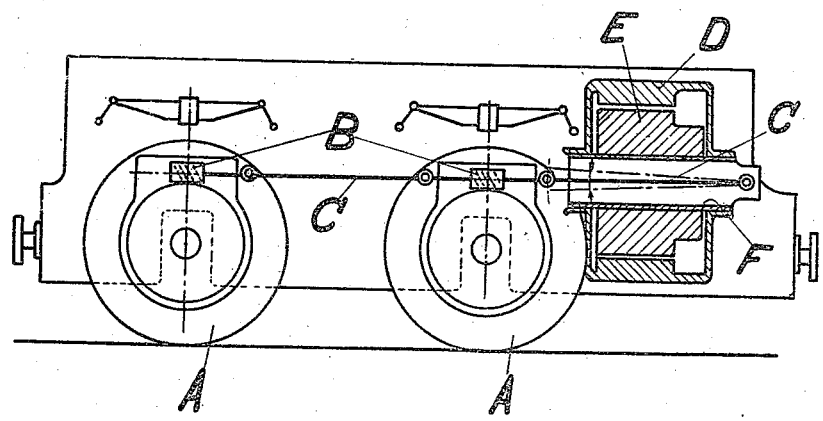
Figure 2:
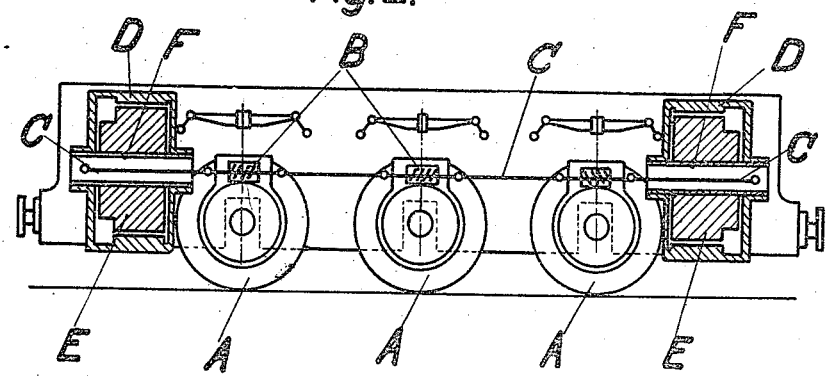

Two constructions of the new drive are shown diagrammatically in the drawing. Figure 1 shows a car with two axles and Figure 2 shows a car with three axles.

Referring to Figure 1, the wheels A are each driven by a worm gear B connected to the motor by a Cardan shaft C. The motor with stator D and rotor E is located beyond the wheelbase, coaxially with the car. The shaft F of the rotor E is hollow. The Cardan shaft C passes through the hollow shaft F and the two are pivotally connected with one another at the end furthest away from the axle. The bore of the hollow shaft must be wide enough to allow the shaft C the room necessary for the maximum inclination. In the arrangement shown in Figure 2 a pair of motors D, E, are provided one at each end of the car, and the Cardan shaft C is pivoted to the hollow shaft F.

I claim:

1. In an electric vehicle having a hollow axle, a worm-drive located entirely within the vehicle frame, a motor located outside the wheel base and co-axial with the worm-drive shaft and with the longitudinal axis of the vehicle, said worm-drive shaft pivoted at its outer end to the motor, and passing through the hollow axle of said motor.

2. In a worm drive for electric vehicles having a hollow axle in which the motor is located outside the wheelbase co-axially with the worm-drive and with the longitudinal axis of the vehicle, said motor having the worm-drive shaft pivoted at its outer end and passing through the hollow axle of said motor, said motor shaft comprising a plurality of coaxial shafts united by Cardan joints.

3. In a worm drive for electric vehicles having a hollow axle in which the motor is located outside the wheelbase and coaxially with the worm drive and with the longitudinal axis of the vehicle, said motor having the worm-drive shaft pivoted at its outer end and passing through the hollow axle of said motor in combination with a pair of motors one at each end of the wheelbase each having the motor shaft pivoted at its rear end within the hollow axle of said motor.

In testimony whereof I have affixed my signature in presence of two witnesses.

GOTTWALT MÜLLER.

Witnesses:
 HEINRICH HIEM,
 MAX EISERMANN.